(12) United States Patent
Lehavi et al.

(10) Patent No.: US 9,703,755 B2
(45) Date of Patent: Jul. 11, 2017

(54) GENERATING AND PARTITIONING POLYNOMIALS

(75) Inventors: David Lehavi, Haifa (IL); Sagi Schein, Haifa (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 143 days.

(21) Appl. No.: 14/397,717

(22) PCT Filed: Jul. 30, 2012

(86) PCT No.: PCT/US2012/048879
§ 371 (c)(1),
(2), (4) Date: Oct. 29, 2014

(87) PCT Pub. No.: WO2014/021826
PCT Pub. Date: Feb. 6, 2014

(65) Prior Publication Data
US 2015/0127694 A1    May 7, 2015

(51) Int. Cl.
*G06F 17/10* (2006.01)
*G06F 17/16* (2006.01)
*G06K 9/62* (2006.01)

(52) U.S. Cl.
CPC .......... *G06F 17/10* (2013.01); *G06K 9/6247* (2013.01); *G06K 9/6287* (2013.01); *G06F 17/16* (2013.01)

(58) Field of Classification Search
CPC ................................ G06F 17/10; G06F 17/16
See application file for complete search history.

(56) References Cited

U.S. PATENT DOCUMENTS

| | | |
|---|---|---|
| 5,555,317 A | 9/1996 | Anderson |
| 6,493,380 B1 | 12/2002 | Wu et al. |
| 7,958,063 B2 | 6/2011 | Long et al. |
| 2008/0313179 A1 | 12/2008 | Trepess et al. |
| 2010/0150577 A1 | 6/2010 | Essiambre et al. |
| 2010/0185423 A1* | 7/2010 | Poulisse ............... G06Q 10/067 703/2 |
| 2010/0238305 A1 | 9/2010 | Dent et al. |

OTHER PUBLICATIONS

Abbott, J. et al.; "Stable Border Bases for Ideals of Points"; Dec. 2008 ; > On pp. 883-894; vol. 43; Issue: 12 ; http://www.sciencedirect.com/science/article/pii/S0747717108000758.

Heldt, Daniel et al, "Approximate computation of zero-dimensional polynomial ideal", J of Symbolic Computation, V.44, pp. 1566-1591, May 19, 2009.

(Continued)

*Primary Examiner* — Matthew Sandifer

(57) ABSTRACT

A non-transitory storage device containing software than, when executed by a processor, causes the processor to generate a projection set of polynomials based on a projection of a space linear combination of candidate polynomials of degree d on polynomials of degree less than d that do not evaluate to less than a threshold on a set of points. The software also causes the processor to compute the singular value decomposition of a matrix containing the difference between candidate polynomials evaluated on the points and the projection set of polynomials evaluated on the points, and to partition the polynomials resulting from the singular value decomposition based on a threshold.

18 Claims, 4 Drawing Sheets

(56) References Cited

OTHER PUBLICATIONS

Kiraly, F.J. et al, "Regression for Sets of Polynomial Equations", Feb. 20, 2012.
Kreuzer, Martin et al, "Subideal Border Bases", Mathematics of Computation, V. 80(274), pp. 1135-1154, Apr. 2011.
Liu, Cheng-Lin et al, "Class-specific feature polynomial classifer for pattern classification and its application to . . . ", Pattern Recognition, V.39, pp. 669-681, 2006.
Nourouzian, Ehsan et al, "Online Persian/Arabic Character Recognition by Polynomial Representation . . . ", IEEE Int'l Conf on Pattern Recognition, 2006.
International Search Report and Written Opinion of the International Searching Authority, mailed Mar. 28, 2013, issued in related PCT Application No. PCT/US2012/048879.

* cited by examiner

GENERATING AND PARTITIONING POLYNOMIALS

BACKGROUND

Data analysis is ubiquitous. Some data, however, is not numerical and, even if numerical, may be non-linear. Examples of non-numerical data include scanned documents and photographs. The types of analysis that might be useful on such non-numerical data may include compression, character recognition, etc. Computers, of course, only understand numbers so non-numerical data may be converted to numbers for the computer to understand and further process.

BRIEF DESCRIPTION OF THE DRAWINGS

For a detailed description of exemplary embodiments of the invention, reference will now be made to the accompanying drawings in which.

DETAILED DESCRIPTION

In accordance with various implementations, numbers are extracted from non-numerical data so that a computing device can further analyze the extracted numerical data and/or perform a desirable type of operation on the data. The extracted numerical data may be referred to as "data points" or "coordinates." A type of technique for analyzing the numerical data extracted from non-numerical data includes determining a unique set of polynomials for each class of interest and then evaluating the polynomials on a set of data points. For a given set of data points, the polynomials of one of the classes may evaluate to 0 or approximately 0. The data points are then said to belong to the class corresponding to those particular polynomials.

The principles discussed herein are directed to a technique by which a computing device processes data points in regards to a class. The technique involves the data points being described in terms of a corresponding class.

Measurements can be made on many types of non-numerical data. For example, in the context of alphanumeric character recognition, multiple different measurements can be made for each alphanumeric character encountered in a scanned document. Examples of such measurements include the average slope of the lines making up the character, a measure of the widest portion of the character, a measure of the highest portion of the character, etc. The goal is to determine a suitable set of polynomials for each possible alphanumeric character. Thus, capital A has a unique set of polynomials, B has its own unique set of polynomials, and so on. Each polynomial is of degree n (n could be 1, 2, 3, etc.) and may use some or all of the measurement values as inputs.

Figure 1:
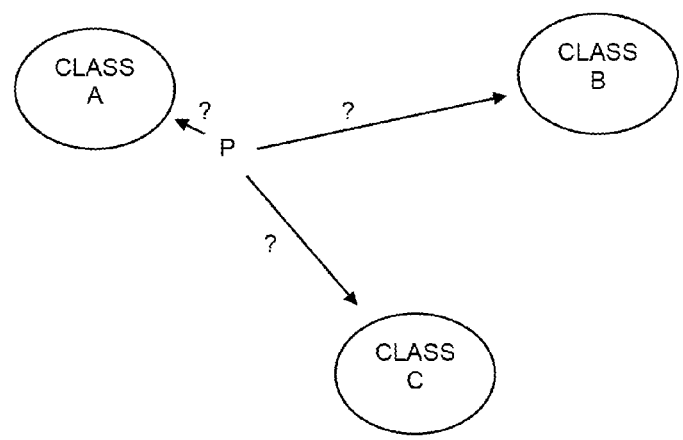
FIG. 1 shows an example of various classes.

FIG. 1 illustrates the existence of three classes—Class A, Class B, and Class C. A unique set of polynomials has been determined to correspond to each class. A data point P is shown. Data point P may actually include multiple data values. The goal is to determine to which class P belongs. The determination is made by plugging data point P into the polynomials of each class and determining which set of polynomials evaluates to near 0. The class corresponding to the set of polynomials that evaluates to near 0 is the class to which P is determined to correspond.

The classes depicted in FIG. 1 might correspond to the letters of the alphabet. For the letter A, for example, if the measurements (also called data points or coordinates) are plugged into the polynomials for the letter A, the polynomials evaluate to 0 or close to 0, whereas the polynomials for the other letters do not evaluate to 0 or approximately 0. So, a system encounters a character in a document, makes the various measurements, plugs those data points (or at least some of them) into each of the polynomials for the various letters, and determines which character's polynomials evaluate to 0. The character corresponding to that polynomial is the character the system had encountered.

Part of the analysis, however, is determining which polynomials to use for each alphanumeric character. A class of techniques called Approximate Vanishing Ideal (AVI) may be used to determine polynomials to use for each class. The word "vanishing" refers to the fact that a polynomial evaluates to 0 for the right set of input coordinates. Approximate means that the polynomial only has to evaluate to approximately 0 for classification purposes. Many of these techniques, however, are not stable. Lack of stability means that the polynomials do not perform well in the face of noise. For example, if there is some distortion of the letter A or extraneous pixels around the letter, the polynomial for the letter A may not at all vanish to 0 even though the measurements were made for a letter A. Some AVI techniques are based on a pivoting technique which is fast but inherently unstable.

The implementations discussed below are directed to a Stable Approximate Vanishing Ideal (SAVI) technique which, as its name suggests, is stable in the face of noise in the input data.

Figure 2:
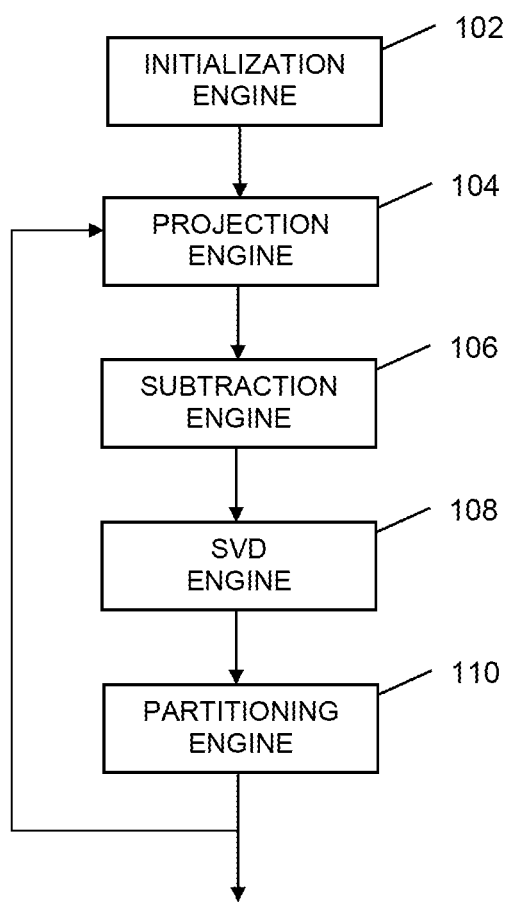
FIG. 2 shows an example of a system in accordance with an implementation.
Figure 3:
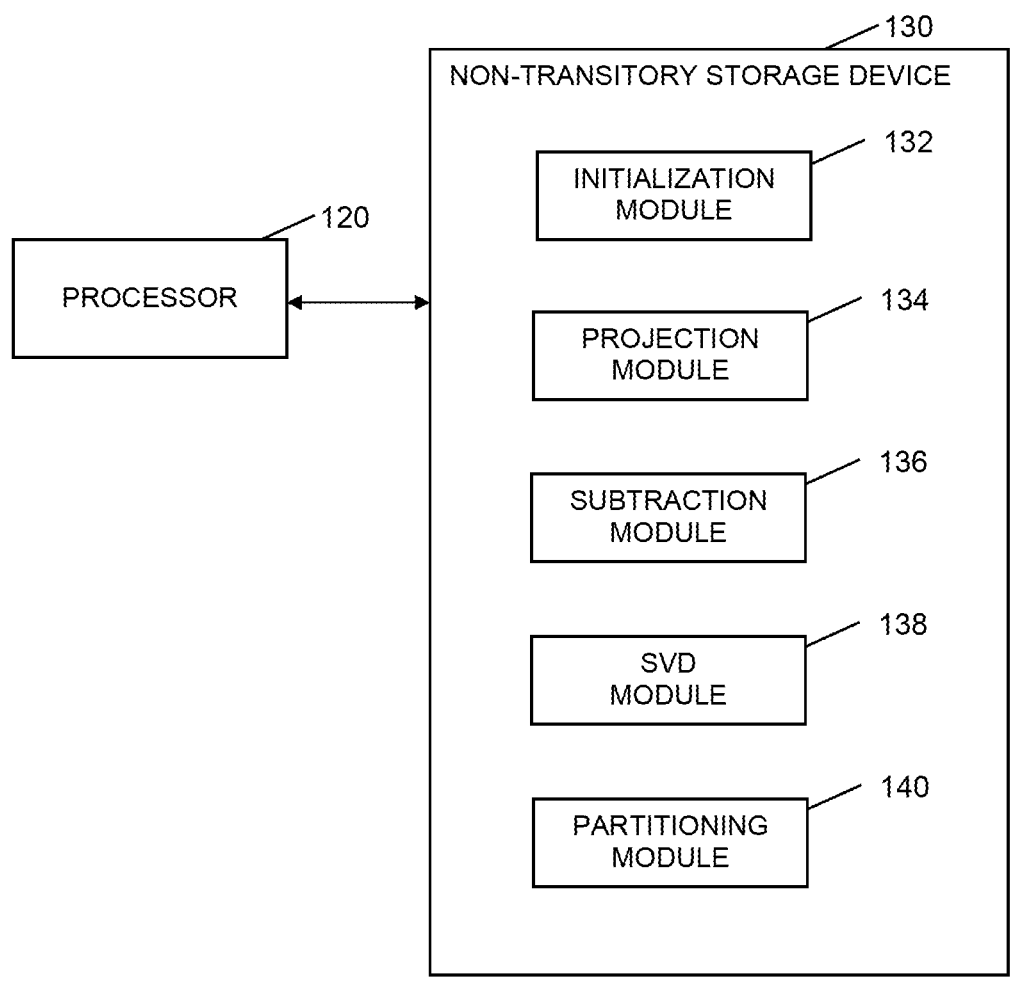
FIG. 3 shows another example of an implementation of a system.

FIG. 2 illustrates a system which includes various engines—an initialization engine 102, a projection engine 104, a subtraction engine 106, a singular value decomposition (SVD) engine 108, and a partitioning engine 110. In some examples, each engine 102-110 may be implemented as a processor executing software. FIG. 3, for example, shows one suitable example in which a processor 120 is coupled to a non-transitory storage device 130. The non-transitory storage device 130 may be implemented as volatile storage (e.g., random access memory), non-volatile storage (e.g., hard disk drive, optical storage, solid-state storage, etc.) or combinations of various types of volatile and/or non-volatile storage.

The non-transitory storage device 130 is shown in FIG. 3 to include a software module that corresponds functionally to each of the engines of FIG. 2. The software modules include an initialization module 132, a projection module 134, a subtraction module 136, an SVD module 138, and a partitioning module 140. Each engine of FIG. 2 may be implemented as the processor 120 executing the corresponding software module of FIG. 3.

The distinction among the various engines 102-110 and among the software modules 132-140 is made herein for ease of explanation. In some implementations, however, the functionality of two or more of the engines/modules may be combined together into a single engine/module. Further, the functionality described herein as being attributed to each engine 102-110 is applicable to the software module corresponding to each such engine, and the functionality described herein as being performed by a given module is applicable as well as to the corresponding engine.

Figure 4:
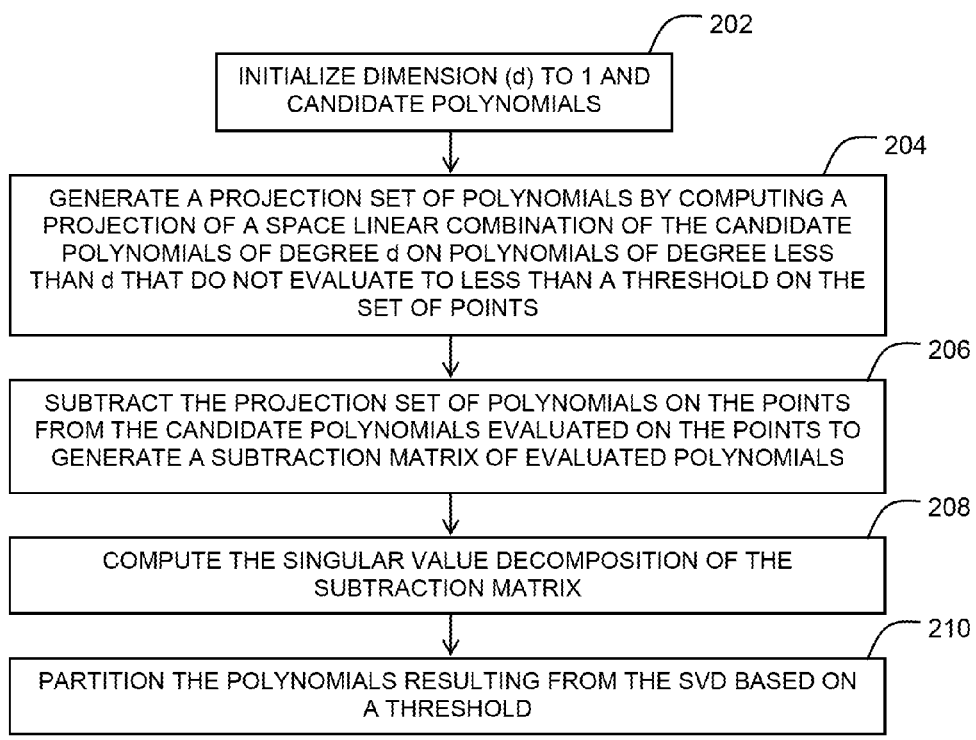
FIG. 4 shows a method in accordance with various examples.

The functions performed by the various engines 102-110 of FIG. 2 will now be described with reference to the flow diagram of FIG. 4. The SAVI process described herein may be an iterative process and the actions illustrated in FIG. 4 represent one iteration of the process. The SAVI process depicted in FIG. 4 is performed for each class for which polynomials are desired to be generated. The data (also called points or coordinates) referenced below represent training data used to generate the correct polynomials.

The initialization engine 102 initializes a dimension (d) to 1 (action 202). The disclosed SAVI process thus begins with dimension 1 polynomials. The initialization engine 102 also initializes a set of candidate polynomials. The candidate polynomials represent the polynomials that will be processed in the given iteration to determine which, if any, of the polynomials evaluate on a given set of points to approximately 0 (e.g., below a threshold). Those candidate polynomials that do evaluate on the points to less than the threshold are chosen as polynomials for the given class. The initial set of candidate polynomials may include all of the monomials in the coordinates. That is, there are as many monomials as there are coordinates in the training data.

The projection engine 104 then processes the set of candidate polynomials, for example, as described in illustrative action 204 in FIG. 4. In action 204, the projection engine 104 generates a projection set of polynomials. In some implementations, the projection set of polynomials is generated by computing a projection of a space linear combination of the candidate polynomials of degree d on polynomials of degree less than d that do not evaluate to 0 on the set of points. In the first iteration of the process d is 1 but in subsequent iterations through the process, d is incremented (2, 3, etc.). In the first pass through the algorithm with d equal to 1, the polynomials of degree less than d (i.e., degree 0) that do not evaluate to 0 on the set of points are represented by a scalar value such as 1/sqrt(number of points), where "sqrt" refers to the square root operator.

The following is an example of the computation of the linear combination of the candidate polynomials of degree d on the polynomials of degree less than d that do not evaluate to 0 on the set of points. The projection engine 104 may multiply the polynomials of degree less than d that do not evaluate to 0 by the polynomials of degree less than d that do not evaluate to 0 evaluated on the points and then multiply that result by the candidate polynomials of degree d evaluated on the points. In one example, the projection engine 104 computes:

$$E_d = O_{<d} O_{<d}(P)^t C_d(P)$$

where $O_{<d}$ represents the set polynomials that do not evaluate to 0 and are of lower than order d, $O_{<d}(P)^t$ represents the transpose of the matrix of the evaluations of the $O_{<d}$ polynomials, and $C_d(P)$ represents the evaluation of the candidate set of polynomials on the set of points (P). $E_d$ represents the projection set of polynomials evaluated on the points.

The subtraction engine 106 subtracts (as indicated at 206 in FIG. 4) the projection set of polynomials evaluated on the points from the candidate polynomials evaluated on the points to generate a subtraction matrix of evaluated polynomials, that is:

$$\text{Subtraction matrix} = C_d(P) - E_d(P)$$

The subtraction matrix represents the difference between evaluations of polynomials of degree d on the points, and evaluations of polynomials of lower degrees on the points.

The SVD engine 108 (at 208 in FIG. 4) then computes the singular value decomposition of the subtraction matrix. The SVD of the subtraction matrix results in the three matrices U, S, and $V^t$. U is a unitary matrix. S is a rectangular diagonal matrix in which the values on the diagonal are the singular values of the subtraction matrix. $V^t$ is the transpose of a unitary matrix and thus also a unitary matrix. That is:

$$\text{Subtraction matrix} = USV^*$$

A matrix may be represented a linear transformation between two distinct spaces. To better analyze the matrix, rigid (i.e., orthonormal) transformations may be applied to these space. The "best" rigid transformations would be the ones which will result in the transformation being on a diagonal of a matrix, and that is exactly what the SVD achieve. The values on the diagonal of the S matrix are called the "singular values" of the transformation.

The candidate polynomials for the next iteration of the SAVI process either include all of the candidate polynomials from the previous iteration or a subset of such polynomials. If a subset is used, then the SAVI process removes from the candidate polynomials those polynomials that evaluate to less than the threshold. If candidate polynomials are to be removed for a subsequent iteration of the process, then such polynomials are removed from further use in a numerically stable manner as described below.

The partitioning engine 110 partitions (action 210 in FIG. 4) the polynomials resulting from the SVD of the subtraction matrix based on a threshold. The threshold may be preconfigured to be 0 or a value greater than but close to 0. Any polynomial that results in a value on the points less than the threshold is considered to be a polynomial associated with the class of points being learned, while all other polynomials then become the candidate polynomials for the subsequent iteration of the SAVI process.

In one implementation, the partitioning engine 110 sets $U_d$ equal to $(C_d - E_d)VS^{-1}$ and then partitions the polynomials of $U_d$ according to the singular values to obtain $G_d$ and $O_d$. $G_d$ is the set of polynomials that evaluate to less than the threshold on the points. $O_d$ is the set of polynomials that do not evaluate to less than the threshold on the points.

The partitioning engine 110 also may increment the value of d, multiply the set of candidate polynomials in degree d−1 that do not evaluate to 0 on the points by the degree 1 candidate polynomials that do not evaluate to 0 on the points. The partitioning engine 110 further computes $D_d = O_1 \times O_{d-1}$ and then sets the candidate set of polynomials for the next iteration of the SAVI process to be the orthogonal complement in $D_d$ of span $Å_{i=1}^{d-1} G_i \times O_{d-i}$.

The partitioning engine 110 then may cause control to loop back to action 204 in FIG. 4 in which the projection engine 104 repeats its operation with an increased degree d and new set of candidate polynomials.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method of determining a unique set of polynomials for a non-numerical data to extract numerical data from the non-numerical data by a computing device, the method comprising:

measuring the non-numerical data, wherein measuring includes measuring a widest portion of the non-numerical data and a highest portion of the non-numerical data;
generating a projection set of polynomials that are projected to identify the non-numerical data based on the non-numerical data measurements by computing a projection of a space linear combination of candidate polynomials of degree d on polynomials of degree less than d that do not evaluate to less than a threshold on a set of points;
subtracting the projection set of polynomials evaluated on the points from the candidate polynomials evaluated on the points to generate a subtraction matrix of evaluated polynomials;
computing the singular value decomposition of the subtraction matrix of evaluated polynomials;
partitioning the polynomials resulting from the singular value decomposition based on a threshold such that partitioning determines a set of polynomials of the unique set of polynomials that identify the non-numerical data; and
identifying the non-numerical data based on the partitioned polynomials and the non-numerical data measurements,
wherein measuring, generating, subtracting, computing, and partitioning are performed by executing modules stored on a non-transitory computer-readable storage device of the computer.

2. The method of claim 1 wherein generating the projection set of polynomials comprises multiplying the polynomials of degree less than d that do not evaluate to less than the threshold by the polynomials of degree less than d that do not evaluate to less than the threshold evaluated on the points and multiplying that result by the candidate polynomials of degree d evaluated on the points.

3. The method of claim 1 further comprising setting d to 1 and initializing the candidate polynomials to all monomials of the points.

4. The method of claim 1 further comprising incrementing d and performing a subsequent iteration of generating the projection set of polynomials, subtracting the projection set of polynomials evaluated on the points from the candidate polynomials evaluated on the points, computing the singular value decomposition and partitioning the polynomials for the incremented value of d using in such subsequent iteration, as the polynomials of degree less than d that do no evaluate to less than the threshold on the set of points, only those polynomials that evaluate to a value above the threshold.

5. The method of claim 1 further comprising:
incrementing d;
multiplying the set of candidate polynomials in degree d−1 that do not evaluate to less than the threshold on the points by the degree 1 candidate polynomials that do not evaluate to less than the threshold on the points, and
repeating the generating the projection set of polynomials, computing the singular value decomposition and partitioning the polynomials for the incremented value of d.

6. The method of claim 1, wherein the non-numerical data is an alphanumeric character.

7. A system for determining a unique set of polynomials for a non-numerical data to extract numerical data from the non-numerical data, comprising:
a processor;
a non-transitory, computer-readable storage device containing instructions that, when executed by the processor, cause the processor to:
measure the non-numerical data, wherein measuring includes measuring a widest portion of the non-numerical data and a highest portion of the non-numerical data;
generate a projection set of polynomials of a space linear combination of candidate polynomials of degree d on polynomials of degree less than d that do not evaluate to less than a threshold on a set of points based on the non-numerical data measurements, wherein the projection set of polynomials are projected to identify the non-numerical data;
generate a subtraction matrix based on the projection set of polynomials evaluated on the points and the candidate polynomials evaluated on the points;
compute a singular value decomposition of the subtraction matrix of evaluated polynomials;
partition the polynomials resulting from the singular value decomposition based on a threshold such that partitioning determines a set of polynomials of the unique set of polynomials that identify the non-numerical data; and
identify the non-numerical data based on the partitioned polynomials and the non-numerical data measurements.

8. The system of claim 7 wherein the instructions to generate the projection set of polynomials cause the processor to multiply the polynomials of degree less than d that do not evaluate to less than the threshold by the polynomials of degree less than d that do not evaluate to less than the threshold evaluated on the points and multiplying that result by the candidate polynomials of degree d evaluated on the points.

9. The system of claim 7, wherein the non-transitory storage-medium further comprises instructions that when executed by the processor, cause the processor to:
set d to 1 and initialize the candidate polynomials to all monomials of the points.

10. The system of claim 7 wherein the instructions to partition the polynomials cause the processor to increment d and then cause a subsequent iteration to be performed of the instructions to generate the projection set of polynomials, subtract the projection set of polynomials evaluated on the points from the candidate polynomials evaluated on the points, compute the singular value decomposition and partition the polynomials for the incremented value of d using in such subsequent iteration, as the polynomials of degree less than d that do not evaluate to less than the threshold on the set of points, only those polynomials that evaluate to a value above the threshold.

11. The system of claim 7 wherein the instructions to generate a projection set of polynomials further cause the processor to:
increment d;
multiply the set of candidate polynomials in degree d−1 that do not evaluate to less than the threshold on the points by the degree 1 candidate polynomials that do not evaluate to less than the threshold on the points, and
cause a subsequent iteration to be performed of the instructions to generate the projection set of polynomials, subtract the projection set of polynomials evaluated on the points from the candidate polynomials evaluated on the points, compute the singular value decomposition, and again partition the polynomials for the incremented value of d.

12. The system of claim 7, wherein the non-numerical data is an alphanumeric character.

13. A non-transitory, computer-readable storage device comprising instructions executable by a processor to determine a unique set of polynomials for a non-numerical data to extract numerical data from the non-numerical data, the non-transitory, computer-readable storage device comprising instructions causing the processor to:
   measure the non-numerical data, wherein measuring includes measuring a widest portion of the non-numerical data and a highest portion of the non-numerical data;
   generate a projection set of polynomials based on a projection of a space linear combination of candidate polynomials of degree d on polynomials of degree less than d that do not evaluate to less than a threshold on a set of points and based on the non-numerical data measurements, wherein the projection set of polynomials are projected to identify the non-numerical data;
   compute the singular value decomposition of a matrix containing the difference between candidate polynomials evaluated on the points and the projection set of polynomials evaluated on the points;
   partition the polynomials resulting from the singular value decomposition based on a threshold such that partitioning determines a set of polynomials of the unique set of polynomials that identify the non-numerical data, and
   identify the non-numerical data based on the partitioned polynomials and the non-numerical data measurements.

14. The non-transitory, computer-readable storage device of claim 13 wherein the software causes the processor to generate the projection set of polynomials by multiplying the polynomials of degree less than d that do not evaluate to 0 by the polynomials of degree less than d that do not evaluate to less than the threshold evaluated on the points and multiplying that result by the candidate polynomials of degree d evaluated on the points.

15. The non-transitory, computer-readable storage device of claim 13 wherein the software causes the processor to set d to 1 and initialize the candidate polynomials to all monomials of the points.

16. The non-transitory, computer-readable storage device of claim 13 wherein the software causes the processor to increment d and perform a subsequent iteration of generating the projection set of polynomials, subtracting the projection set of polynomials evaluated on the points from the candidate polynomials evaluated on the points, computing the singular value decomposition and partitioning the polynomials for the incremented value of d using in such subsequent iteration, as the polynomials of degree less than d that do no evaluate to less than the threshold on the set of points, only those polynomials that evaluate to a value above the threshold.

17. The non-transitory, computer-readable storage device of claim 13 wherein the software causes the processor to:
   increment d;
   multiply the set of candidate polynomials in degree d−1 that do not evaluate to less than the threshold on the points by the degree 1 candidate polynomials that do not evaluate to less than the threshold on the points, and
   repeat generating the projection set of polynomials, computing the singular value decomposition, subtracting the projection set of polynomials evaluated on the points from the candidate polynomials evaluated on the points, and partitioning the polynomials for the incremented value of d.

18. The non-transitory, computer-readable storage device of claim 13, wherein the non-numerical data is an alphanumeric character.

* * * * *